(12) United States Patent
Willie et al.

(10) Patent No.: US 8,145,774 B2
(45) Date of Patent: Mar. 27, 2012

(54) PROGRESSIVELY ACCESSING DATA BLOCKS RELATED TO PAGES

(75) Inventors: Anthony L Willie, Woodinville, WA (US); Marcio De Mello, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1293 days.

(21) Appl. No.: 11/269,023

(22) Filed: Nov. 8, 2005

(65) Prior Publication Data

US 2007/0106759 A1    May 10, 2007

(51) Int. Cl.
*G06F 15/16* (2006.01)
(52) U.S. Cl. ......... 709/230; 709/228; 709/229; 709/231
(58) Field of Classification Search .................. 709/230, 709/228, 229, 231
See application file for complete search history.

(56) References Cited

U.S. PATENT DOCUMENTS

| | | | |
|---|---|---|---|
| 6,094,684 A * | 7/2000 | Pallmann | 709/227 |
| 2002/0174189 A1* | 11/2002 | Peng | 709/217 |
| 2003/0055871 A1* | 3/2003 | Roses | 709/203 |
| 2003/0188021 A1* | 10/2003 | Challenger et al. | 709/246 |
| 2006/0155819 A1* | 7/2006 | Grabinar et al. | 709/213 |
| 2007/0174428 A1* | 7/2007 | Lev Ran et al. | 709/218 |
| 2009/0077173 A1* | 3/2009 | Lowery et al. | 709/203 |

* cited by examiner

*Primary Examiner* — Jeffrey Pwu
*Assistant Examiner* — Abdelnabi Musa
(74) *Attorney, Agent, or Firm* — Lee & Hayes, PLLC (57) ABSTRACT

Techniques relating to progressive data downloading are described. In one instance, a system includes an application configured to utilize data blocks to display content in a user-interface. The system also includes a progressive download component configured to retrieve specific data blocks from a data container responsive to requests from the application.

18 Claims, 7 Drawing Sheets

PROGRESSIVELY ACCESSING DATA BLOCKS RELATED TO PAGES

BACKGROUND

When a user attempts to open a remotely stored document or file, a delay often results before the document is presented to the user. For instance, a user may be surfing the web utilizing a web-browser application. If the user clicks to open a document located on the web, obtaining document data may delay actually displaying content of the document for the user. Similarly, if the user clicks on a subsequent page or link within the document the user may encounter additional delay before the subsequent page's content can be displayed. Such scenarios may be more pronounced with slow speed network connections, but regardless of the network bandwidth the user desires the document's content to be displayed as quickly as possible.

SUMMARY

Techniques relating to progressive data downloading are described. In one instance, a system includes an application configured to utilize data blocks to display content in a user-interface. The system also includes a progressive download component configured to retrieve specific data blocks from a data container responsive to requests from the application.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

DETAILED DESCRIPTION

Overview

The described techniques relate to facilitating data transfer between a data source and a data consumer. For instance, a user may enter a user-command to a data consumer to open a document. The document may be stored in the data source as a set of data blocks. The data consumer processes the document's data blocks to generate a user-interface displaying the document's content for the user. In many instances obtaining the data blocks for the data consumer can be a limiting factor to the data consumer processing the data blocks and generating the user-interface. For example, such a scenario is often encountered when the data blocks are downloaded from the data source to the data consumer over a network. Data transfer over the network can act as a bottleneck to processing by the data consumer. For instance, a rate of data transfer over the network may be less than a rate of data processing by the data consumer and/or the data processing at the data consumer may be delayed pending the arrival of specific data block(s).

The described implementations can facilitate data transfer over the network, by among other techniques, progressively retrieving data blocks which are specifically requested by the data consumer. For instance, progressive retrieval of data blocks is given priority over other data retrieval techniques which may also be employed to obtain data blocks for the data consumer. For example, some implementations may employ sequential front-to-back downloading of data blocks from the data source in conjunction with progressive downloading. In such an instance, retrieving specifically requested data blocks is given priority over sequential downloading of data blocks. While network scenarios are described above and below, the described progressive downloading techniques can be utilized in any scenario where data transfer between a data source and a data consumer potentially limits system performance.

EXEMPLARY SYSTEMS

Figure 1:
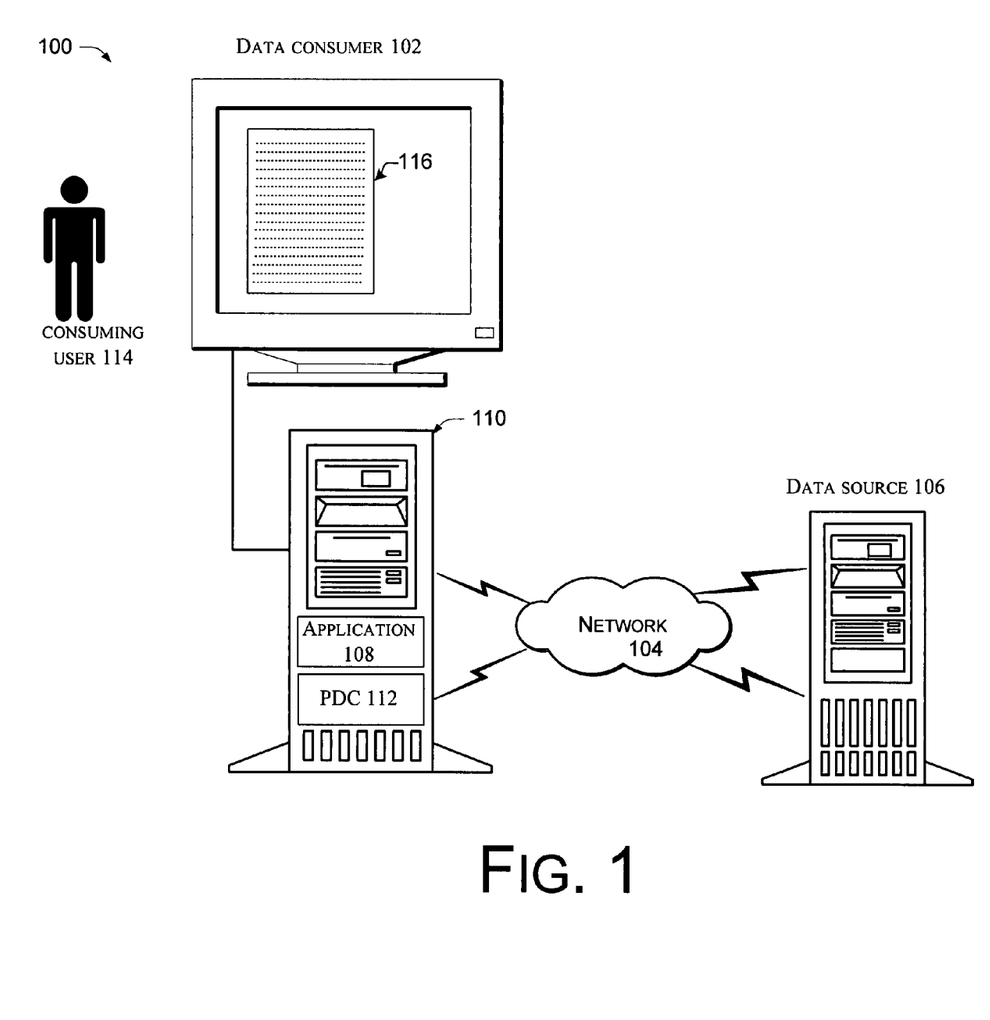
FIGS. 1 and 4 illustrate exemplary systems upon which progressive data downloading can be embodied in accordance with one implementation.

FIG. 1 shows an exemplary system 100 configured to implement progressive data downloading in accordance with one implementation. System 100 includes a data consumer 102 which consumes data obtained over a network 104 from a data source 106. In this illustrated implementation, data consumer 102 is embodied as an application 108 running on a computing device 110. In this particular instance the computing device 110 is manifested as a desktop computing device, however, the data consumer 102 could be manifested on a laptop computer, cell phone, personal digital assistant (PDA), or other class of computing device configured to receive data from a data source.

In this particular configuration, a progressive download component (PDC) 112 can receive data requests from data consumer 102. The progressive download component facilitates transfer of requested data from data source 106. For instance, in a network scenario such as the internet, a consuming user 114 may, for example, click on a hyperlink to open a document on application 108. Responsive to the user-command, the application attempts to generate a user-interface 116 displaying the document's content. The document may be comprised of a number of data blocks which contribute to the visual content which is displayed by the application for the user. In order for application 108 to begin to display the document on user-interface 116, some or all of the data blocks are obtained from data source 106. In many instances, a network transfer rate is a limiting factor in system performance. Or stated another way, in many traditional scenarios the application 108 often has to wait for data blocks which it utilizes to create the user-interface 116. The progressive download component 112 can facilitate system performance by retrieving specific data blocks from data source 106 responsive to requests from application 108. Examples of such scenarios are described in more detail below.

Figure 2:
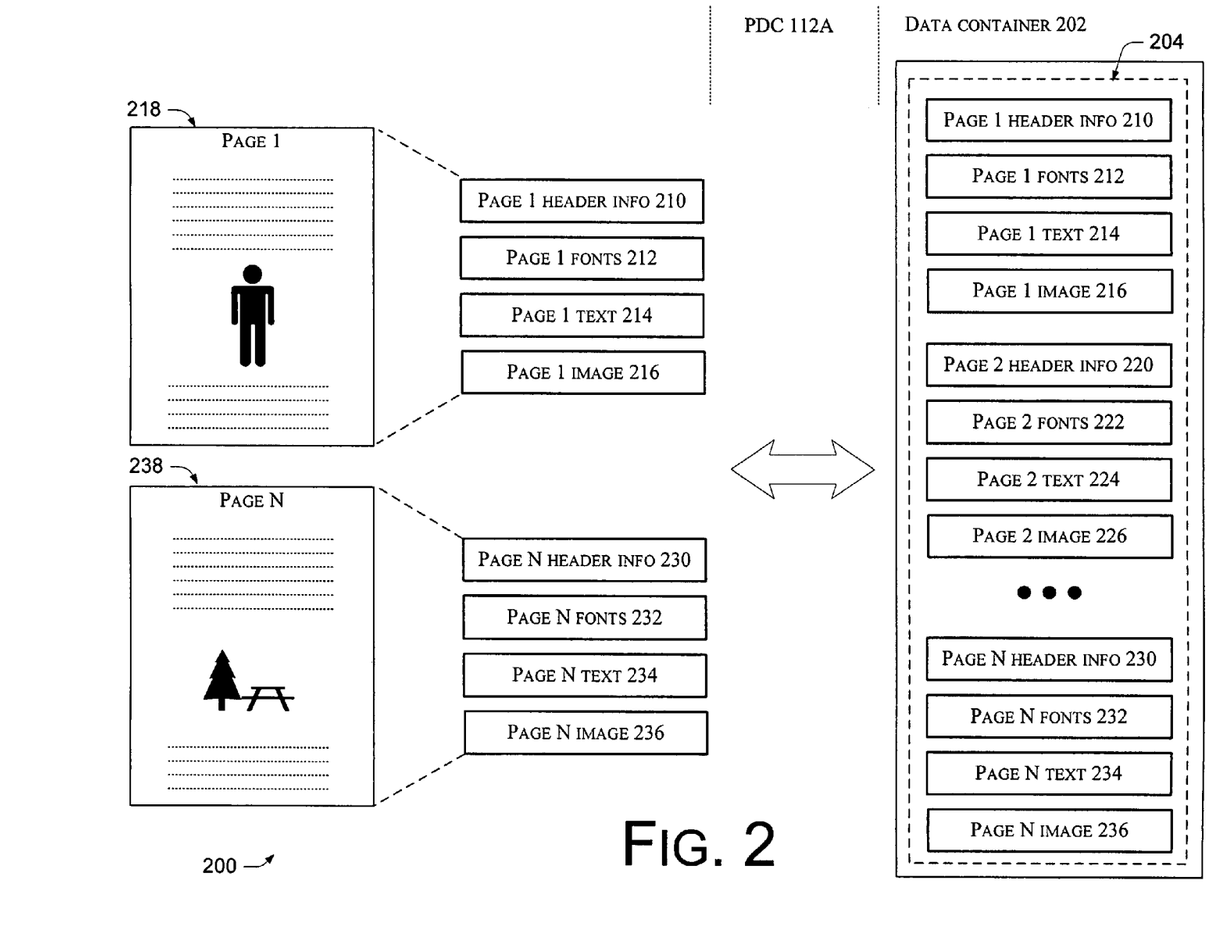
FIGS. 2 and 3 illustrate exemplary scenarios in which progressive data downloading can be embodied in accordance with one implementation.

FIG. 2 illustrates a scenario 200 in which the progressive download component can provide specific data blocks to a data consumer in accordance with one implementation. For purposes of explanation, scenario 200 is organized with a data consumer in the form of an application 108A illustrated on the left side of the physical page on which FIG. 2 appears. Further, a data source, in the form of a data container 202, is illustrated on the right side of the printed page. While the data source is manifested as a data container in this implementation, other implementations may manifest the data source as a data proxy. A data proxy facilitates acquiring data in various scenarios. For instance, a data proxy may be utilized to acquire dynamic data, data from databases, and streaming data among other scenarios.

In this instance, a progressive download component 112A is illustrated between the application 108A and the data container 202 to facilitate data transfer therebetween. Data container 202 contains a document 204 in the form of multiple data blocks which are described with specificity below.

Assume for purposes of explanation regarding scenario 200 that a user has entered some type of user-command relative to application 108A to open document 204. Examples of a user-command include clicking on a hyper-link, and selecting a document from a dropdown menu, among others. The skilled artisan should recognize other user-commands for opening a document, such as document 204. In this scenario, data container 202 is organized in a format which stores data related to pages of the document 204 in a sequential front-to-back or top-to-bottom manner. As such, the data blocks relating to a first page of the document are at the front or top of data container 202 and data blocks associated with subsequent pages are numerically arranged culminating with the data blocks relating to the last page of the document occurring at the bottom or back of the data container. Accordingly, if data blocks are downloaded from front to back, the first data blocks will relate to page one of document 204. In this instance data blocks 210-216 relate to page 1. In this particular example, data block 210 contains page 1 header information, data block 212 contains page 1 fonts, data block 214 contains page 1 text, and data block 216 contains a page 1 image. Of course, this is but one example of the number and/or categorization of data blocks associated with a given document page. Application 108A can generate a visual representation of page 1 designated generally at 218 once the application obtains data blocks 210-216 relating to page 1. The data blocks at the front of the data container can be obtained for the application either by progressive download component 112A and/or by a sequential download mechanism. This aspect will be described in detail below in relation to FIG. 4.

Further assume that while viewing page 1, which is designated as 218, that the user clicks on a hyperlink within page 1 to a subsequent page N. Page N could be any page subsequent to page 2, though the advantages described below are magnified in instances were page N is a large page number, such as page 300 for example. Responsive to the user's action of clicking on the hyperlink to page N, Application 108A requests data blocks relating to page N. In a traditional scenario where the data container's data blocks are downloaded in a standard front-to-back manner, the data blocks are made available to the application in a sequential manner. For instance, after data blocks 210, 212, 214, and 216 relating to page 1 are downloaded, then data blocks relating to page 2 are downloaded and then each subsequent page is downloaded. So for example, data blocks relating to page 2 header information 220, page 2 fonts 222, page 2 text 224, and page 2 image 226 are downloaded as well as any intervening page's data blocks before finally data blocks relating to page N are downloaded and are available to application 108A. During such time, the application is generally unresponsive and the user does not get to see the content of requested page N.

Contrastingly, progressive download component 112A detects the application's requests for data blocks specifically relating to page N and requests data blocks 230, 232, 234, and 236 from the data container 202. In this example, the data blocks include page N header information 230, page N fonts 232, page N text 234, and page N image 236. In some implementations, the progressive download component can recognize that the application has requested multiple data blocks which can be requested from the data container with a single request. For instance, in the present example the application makes a request for data block 230, a request for data block 232, a request for data block 234, and a request for data block 236. The progressive download component 112A can make a single request to the data container 202 for data blocks 230-236. Such a technique can speed processing and/or reduce an amount of processing resources which are utilized to obtain the data blocks.

The progressive download component 112A receives the requested data blocks 230-236 from the data container 202 and makes the data blocks available to the application 108A. The application can then generate a representation of page N which is designated as 238 from the data blocks 230-236. The progressive download component's techniques of obtaining specifically requested data blocks from the data container contributes to reduced delay in generating representation 238 of page N. For instance, delay is reduced since the application did not have to wait through the downloading of data blocks relating to intervening pages 2-(N−1) prior to receiving the requested data blocks 230-236.

In at least some implementations, the progressive download component 112A can function with a variety of different applications and data containers. For instance, in some of these implementations, the progressive download component can be thought of as content agnostic in that it does not need to read or understand the data within the data blocks. Such implementations allow the progressive download component to function in a variety of scenarios without having to be updated for different and/or new data formats. Further, since the progressive download component does not need to read the data, less processing resources may be utilized in transferring the requested data blocks.

Figure 3:
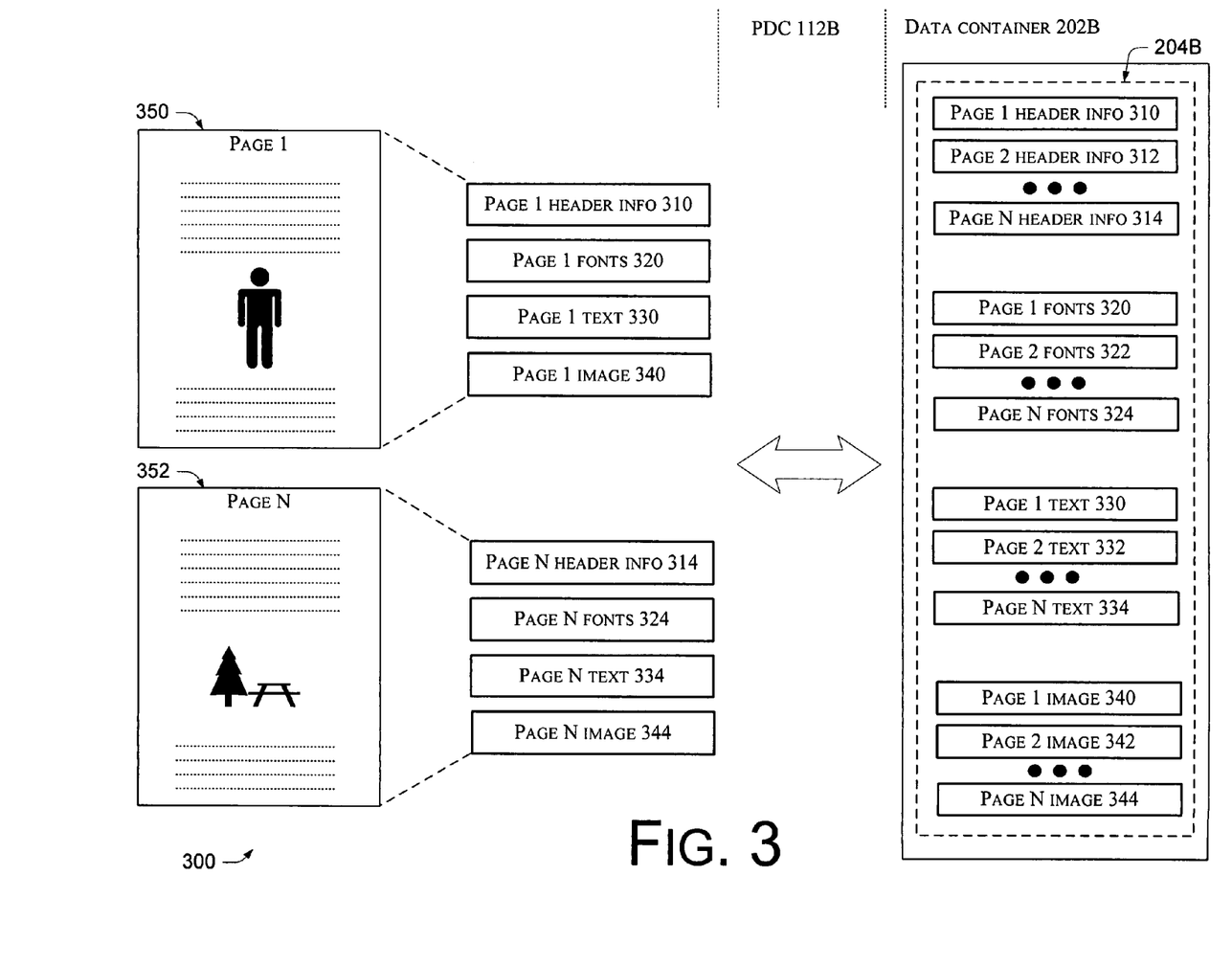

FIG. 3 illustrates another scenario 300 in which the progressive download component can provide specific data blocks to an application in accordance with one implementation. The organizational layout of FIG. 3 is similar to that described above in relation to FIG. 2 with an application 108B positioned on the left-hand side of the page, a data container 202B positioned on the right-hand side, and a progressive download component 112B positioned therebetween. Data container 202B stores data blocks of document 204B. In this scenario, however, data container 202B is not organized sequentially based on pages, but is organized in a format which groups data blocks together by type of content. For instance, data blocks storing image data are stored proximate one another and data blocks relating to fonts are stored proximate one another. This is but one example of data organization which is not based upon mirroring the document's sequential page arrangement in the manner evidenced in FIG. 2. Other examples should be recognized by the skilled artisan.

In this instance, data blocks relating to header information are at the front of the data container 202B. Specifically designated in this example are data blocks for page 1 header information 310, page 2 header information 312, and page N header information 314. The next data blocks relate to fonts. Specifically designated are data blocks for page 1 fonts 320, page 2 fonts 322, and page N fonts 324. Data blocks relating to text follow the font data blocks. Specifically designated are data blocks relating to page 1 text 330, page 2 text 332, and page N text 334. The last illustrated data blocks relate to document images. Specifically designated are data blocks for page 1 image 340, page 2 image 342, and page N image 344. Though not specifically illustrated, in some document formats document 204B may also include some type of index that delineates which data blocks relate to particular pages.

In order for application 108B to display a representation 350 of page 1 for a user, the application utilizes page 1 header information 310, page 1 font information 320, page 1 text information 330, and page 1 image information 340. In but one example application 108B may request data blocks 310, 320, 330 and 340 in an attempt to generate page 1 representation 350. Progressive download component 112B facilitates downloading the requested data blocks from data container 202B and making the data blocks available to the application 108B. Further, consistent with the example described above in relation to FIG. 2, if the user viewing page 1 subsequently clicks on an embedded hyperlink to page N then application 108B can request the page N data blocks 314, 324, 334, and 344. Responsive to detecting the application's requests, progressive download component 112B requests data blocks 314, 324, 334, and 344 from the data container. Once downloaded the progressive download component makes the requested data blocks available to the application such that the application can generate page N as indicated at 352. The progressive download component downloads the requested data blocks for the application with reduced delay compared to sequentially downloading the entire data container.

Figure 4:
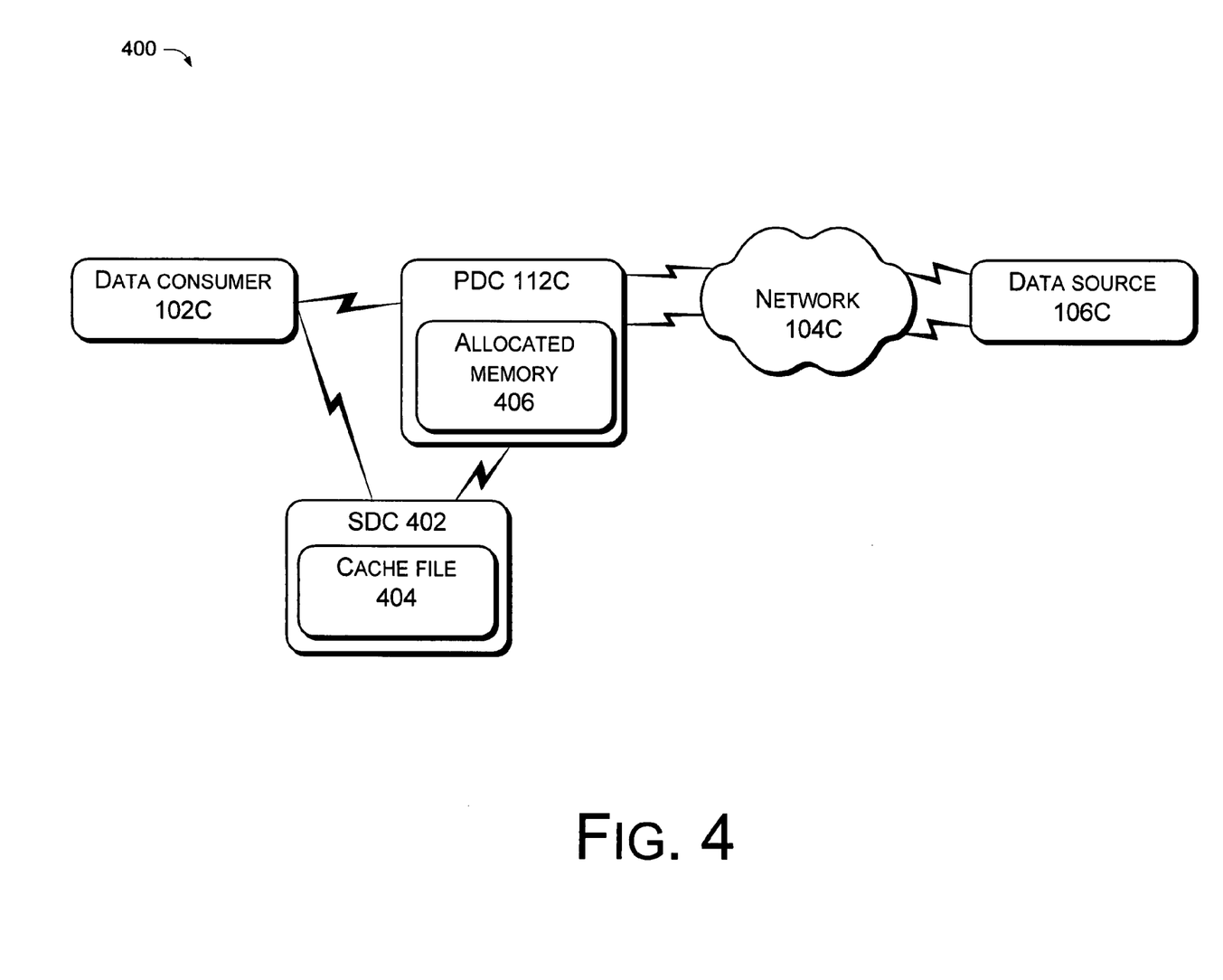

FIG. 4 illustrates an example of a system 400 in which progressive download component 112C can allocate available data transfer resources between a data source 106C and a data consumer 102C. For ease of explanation, in this particular system configuration, available data transfer resources are represented generally by network 104C. Networks commonly act as bottlenecks during data transfer and processing and as such provide a useful example for allocation of data transfer resources. System 400 also includes a sequential download component (SDC) 402. The sequential download component 402 serves to sequentially download data blocks and place the data blocks in a cache file 404. Data consumer 102C can access the data blocks from cache file 404.

In this implementation, progressive download component 112C can obtain specific data blocks for the data consumer 102C consistent with the examples provided above in FIGS. 2-3. (In the examples of FIGS. 2-3 the data consumer is manifested as an application). Data blocks obtained by the progressive download component can be held for the data consumer in allocated memory 406. The allocated memory may be a shared or dedicated resource as should be recognized by the skilled artisan. In this particular system configuration, progressive download component 112C and sequential download component 402 collectively provide data blocks from the data source 106C to data consumer 102C. For example, consider a scenario where a user of data consumer 102C attempts to open a document contained as data blocks in data source 106C. In but one configuration, sequential download component 402 begins to sequentially download data blocks into cache file 404. In an instance of a request from data consumer 102C for a specific data block, the progressive download component 112C requests that specific data block from data source 106C. In at least some implementations, the progressive download component has priority to the data transfer resources of network 104C and can block or otherwise subjugate data transfer to sequential download component 402 until the progressive download component's specific data blocks are received over network 104C. Once the specific data blocks are received, the progressive download component allows the data transfer to the sequential download component to resume. Alternatively to an all-or-nothing configuration, some implementations allow simultaneous data transfer to both the progressive download component 112C and the sequential download component 402 such that any bandwidth not utilized by the progressive download component may be allocated to the sequential download component.

While the implementations described above in relation to FIG. 4 entail a dual-mode of obtaining data blocks either as specifically requested or sequentially, other implementations may exclusively utilize progressive downloading. For instance, such an implementation may download only specifically requested data blocks. Such an implementation may be performant in scenarios where many of the data blocks of the data source would not be utilized by the data consumer. In such scenarios, transferring and processing of all data blocks from the data source would waste system resources. By obtaining only specifically requested data blocks system resources can be allocated to other tasks. In still other implementations, the progressive download component may coordinate network resources among a plurality of download components.

For ease of explananation, FIG. 4 illustrates data transfer between sequential download component 402 and data source 106C passing through progressive download component 112C. This is but one configuration. For example, in another exemplary configuration, network 104C may be coupled in parallel to both the progressive download component 112C and the sequential download component 402 with the progressive download component 112C having some mechanism for affecting or controlling allocation of network bandwidth to itself, i.e. the progressive download component and the sequential download component 402.

In some implementations, progressive download component 112C can have system priority over the data consumer 102C. For instance, the data consumer may request a given data block and then subsequently request the same given data block. The progressive download component can check the requested and/or available data blocks before requesting the given data block from the data source 106C. For instance, in one example, the data consumer 102C may request a hypothetical data block AA which the progressive download component obtains and places in allocated memory 406. The data consumer may subsequently again request hypothetical data block AA. Before requesting the data block from the data source, the progressive download component scans the allocated memory 406 and/or the cache file 404 and finds that hypothetical data block AA is available. In at least some implementations in such a scenario, the progressive download component 112C has priority over data consumer 102C and can decide not to complete the second request for hypothetical data block AA to data source 106C. In another scenario, the data consumer may request hypothetical data blocks BB, CC, and DD. The progressive download component upon checking the allocated memory 406 and the cache file 404 may decide that hypothetical data block DD is already available and may make a single request for remaining hypothetical data blocks BB-CC.

Another example of how the progressive download component has priority to over-ride application requests can be described in relation to FIG. 3 in combination with FIG. 4. For instance, in relation to FIG. 3, assume that data blocks 310, 320, 330, and 340 relating to page 1 are provided to the application such that the page is displayed for a user as indicated at 350. In the configuration illustrated in FIG. 4 these data blocks (310, 320, 330, and 340) are available to the application either from the cache file 404 or the allocated memory 406. If the user subsequently clicks in page 1 on a hyperlink to page N, then data blocks 314, 324, 334, and 344 are requested and made available to the application so that page N can be displayed as indicated at 352. If the user then clicks in page N on a hyperlink back to page 1, the application may again request the data blocks related to page 1. The progressive download component may check to see whether those data blocks 310, 320, 330, and 340 are still available to the application. If the progressive download component locates some or all of the requested blocks in the cache file 404 or allocated memory 406, then the progressive download component may disregard the application's request in relation to the located blocks. The progressive download component may also facilitate the application obtaining the located data blocks. For instance, the progressive download component may direct the application to look in, for instance, the cache file for the located block(s), among other examples.

Figure 5:
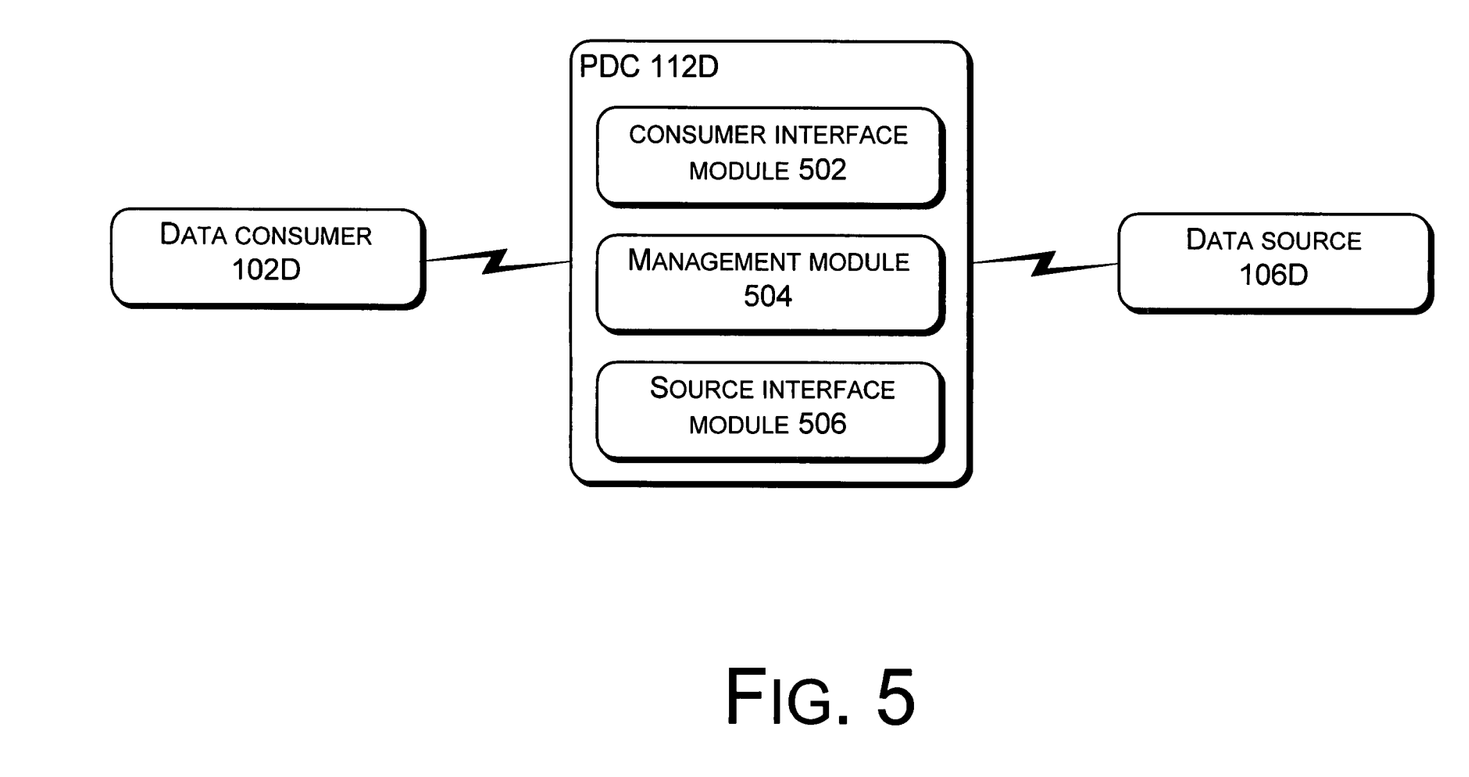
FIG. 5 illustrates an exemplary progressive download component configuration in accordance with one implementation.

FIG. 5 illustrates a logic layer configuration of but one exemplary progressive download component 112D consistent with the functionality described above and below. In this particular implementation, the progressive download component includes a consumer interface module 502, a management module 504, and a source interface module 506.

Consumer interface module 502 facilitates communication between the progressive download component 112D and the data consumer 102D. For instance, the consumer interface module can receive data block requests from the data consumer. Further, the consumer interface module 502 can facilitate making the responsively obtained data blocks available to the data consumer. For instance, the consumer interface module may send the data blocks to the data consumer and/or allow the data consumer to access the data blocks in the progressive download component's allocated memory 406 (designated with specificity in relation to FIG. 4).

Source interface module 506 facilitates communications with data source 106D. For instance, in examples described above, such communication is achieved over a network. Source interface module 506 can facilitate communications over various network protocols such as HTTP, and UDP, among others.

Management module 504 manages the consumer interface module 502 and the source interface module 506. Further, management module 504 evaluates whether a specific data block request detected by consumer interface module 502 will result in a request to data source 106D via the source interface module 506. For instance, before requesting the specific data block the management module 504 may determine if the specific data block is already available in the progressive download component's allocated memory 406 or the cache file 404 (both of which are designated with specificity in relation to FIG. 4). The management module 504 may also check to see if the specific data block has already been requested but has not yet been downloaded. In some configurations, the management module may also try to group a set of specific data blocks requested by the data consumer into a single request to the data source 106D.

In some configurations, management module 504 can also allocate data transfer bandwidth between requests for specific data blocks which are handled in a progressive manner by the progressive download component 112D and sequential data transfer from the data source such as may be handled by the sequential download component 402 (designated with specificity in FIG. 4).

The implementations described above function to download data blocks in a progressive manner responsive to specific requests from a data consumer. Such techniques serve to reduce delays relative to downloading data blocks in a less responsive manner such as through sequential downloading.

EXEMPLARY COMPUTING ENVIRONMENT

Figure 6:
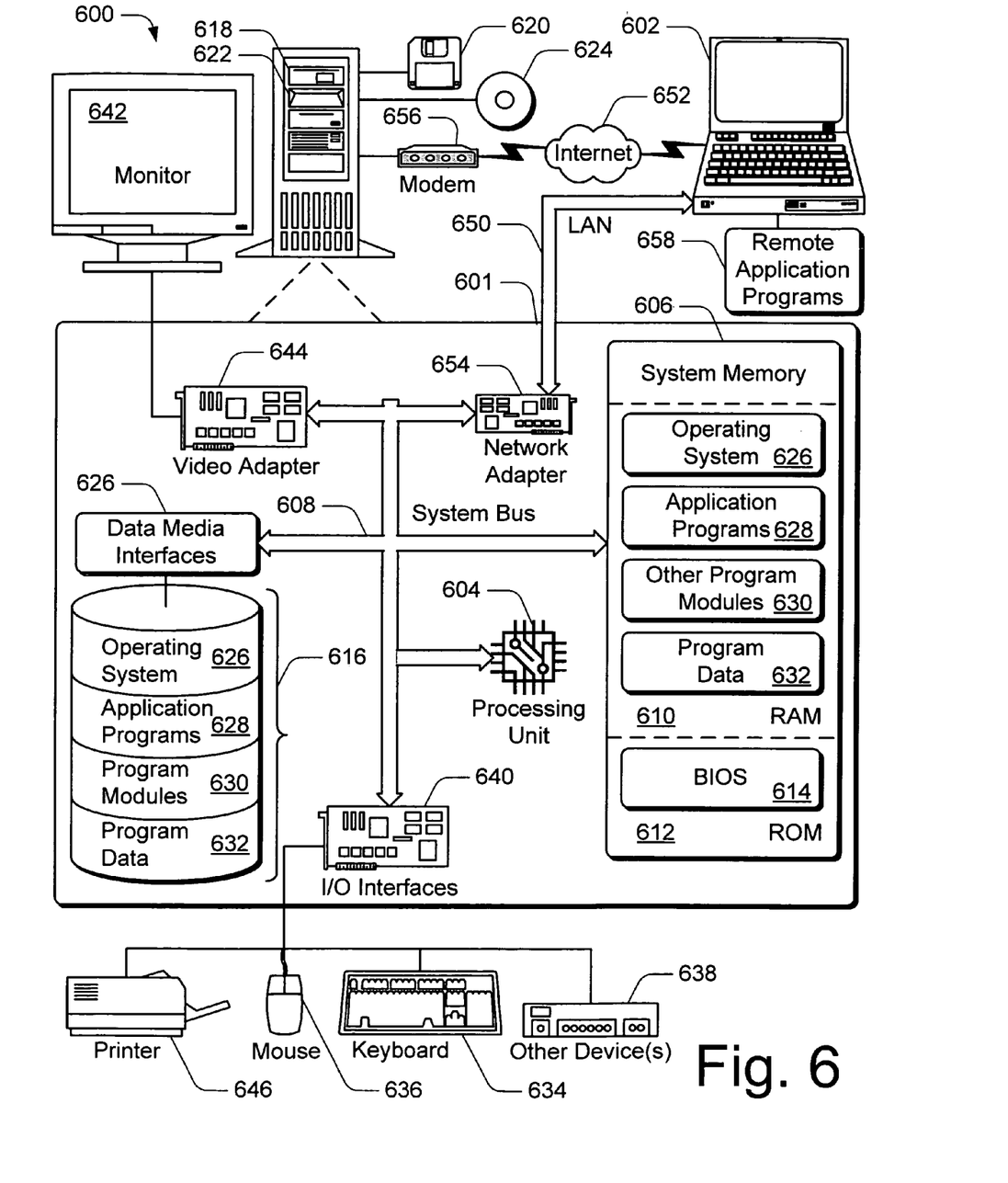
FIG. 6 illustrates exemplary systems, devices, and components in an environment upon which progressive data downloading can be embodied in accordance with one implementation.

FIG. 6 represents an exemplary system or computing environment 600 upon which progressive data downloading may be implemented. System 600 includes a general-purpose computing system in the form of a first machine 601 and a second machine 602.

The components of first machine 601 can include, but are not limited to, one or more processors 604 (e.g., any of microprocessors, controllers, and the like), a system memory 606, and a system bus 608 that couples the various system components. The one or more processors 604 process various computer executable instructions to control the operation of first machine 601 and to communicate with other electronic and computing devices. The system bus 608 represents any number of several types of bus structures, including a memory bus or memory controller, a peripheral bus, an accelerated graphics port, and a processor or local bus using any of a variety of bus architectures.

System 600 includes a variety of computer readable media which can be any media that is accessible by first machine 601 and includes both volatile and non-volatile media, removable and non-removable media. The system memory 606 includes computer-readable media in the form of volatile memory, such as random access memory (RAM) 610, and/or non-volatile memory, such as read only memory (ROM) 612. A basic input/output system (BIOS) 614 maintains the basic routines that facilitate information transfer between components within first machine 601, such as during start-up, and is stored in ROM 612. RAM 610 typically contains data and/or program modules that are immediately accessible to and/or presently operated on by one or more of the processors 604.

First machine 601 may include other removable/non-removable, volatile/non-volatile computer storage media. By way of example, a hard disk drive 616 reads from and writes to a non-removable, non-volatile magnetic media (not shown), a magnetic disk drive 618 reads from and writes to a removable, non-volatile magnetic disk 620 (e.g., a "floppy disk"), and an optical disk drive 622 reads from and/or writes to a removable, non-volatile optical disk 624 such as a CD-ROM, digital versatile disk (DVD), or any other type of optical media. In this example, the hard disk drive 616, magnetic disk drive 618, and optical disk drive 622 are each connected to the system bus 608 by one or more data media interfaces 626. The disk drives and associated computer readable media provide non-volatile storage of computer readable instructions, data structures, program modules, and other data for first machine 601.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, application programs 628, other program modules 630, and program data 632 (or some combination thereof) may include an embodiment of the systems and methods described herein.

A user can interface with first machine 601 via any number of different input devices such as a keyboard 634 and pointing device 636 (e.g., a "mouse"). Other input devices 638 (not shown specifically) may include a microphone, joystick, game pad, controller, satellite dish, serial port, scanner, and/or the like. These and other input devices are connected to the processors 604 via input/output interfaces 640 that are coupled to the system bus 608, but may be connected by other interface and bus structures, such as a parallel port, game port, and/or a universal serial bus (USB).

A monitor 642 or other type of display device can be connected to the system bus 608 via an interface, such as a video adapter 644. In addition to the monitor 642, other output peripheral devices can include components such as speakers (not shown) and a printer 646 which can be connected to first machine 601 via the input/output interfaces 640.

First machine 601 can operate in a networked environment using logical connections to one or more remote computers, such as second machine 602. By way of example, the second machine 602 can be a personal computer, portable computer, a server, a router, a network computer, a peer device or other common network node, and the like. The second machine 602 is illustrated as a portable computer that can include many or all of the elements and features described herein relative to first machine 601.

Logical connections between first machine 601 and the second machine 602 are depicted as a local area network (LAN) 650 and a general wide area network (WAN) 652. Such networking environments are commonplace in offices, enterprise-wide computer networks, intranets, and the Internet. When implemented in a LAN networking environment, the first machine 601 is connected to a local network 650 via a network interface or adapter 654. When implemented in a WAN networking environment, the first machine 601 typically includes a modem 656 or other means for establishing communications over the wide area network 652. The modem 656, which can be internal or external to first machine 601, can be connected to the system bus 608 via the input/output interfaces 640 or other appropriate mechanisms. The illustrated network connections are exemplary and other means of establishing communication link(s) between the first and second machines 601, 602 can be utilized.

In a networked environment, such as that illustrated with System 600, program modules depicted relative to the first machine 601, or portions thereof, may be stored in a remote memory storage device. By way of example, remote application programs 658 are maintained with a memory device of second machine 602. For purposes of illustration, application programs and other executable program components, such as the operating system 626, are illustrated herein as discrete blocks, although it is recognized that such programs and components reside at various times in different storage components of the first machine 601, and are executed by the processors 604 of the first machine.

EXEMPLARY PROCESSES

Figure 7:
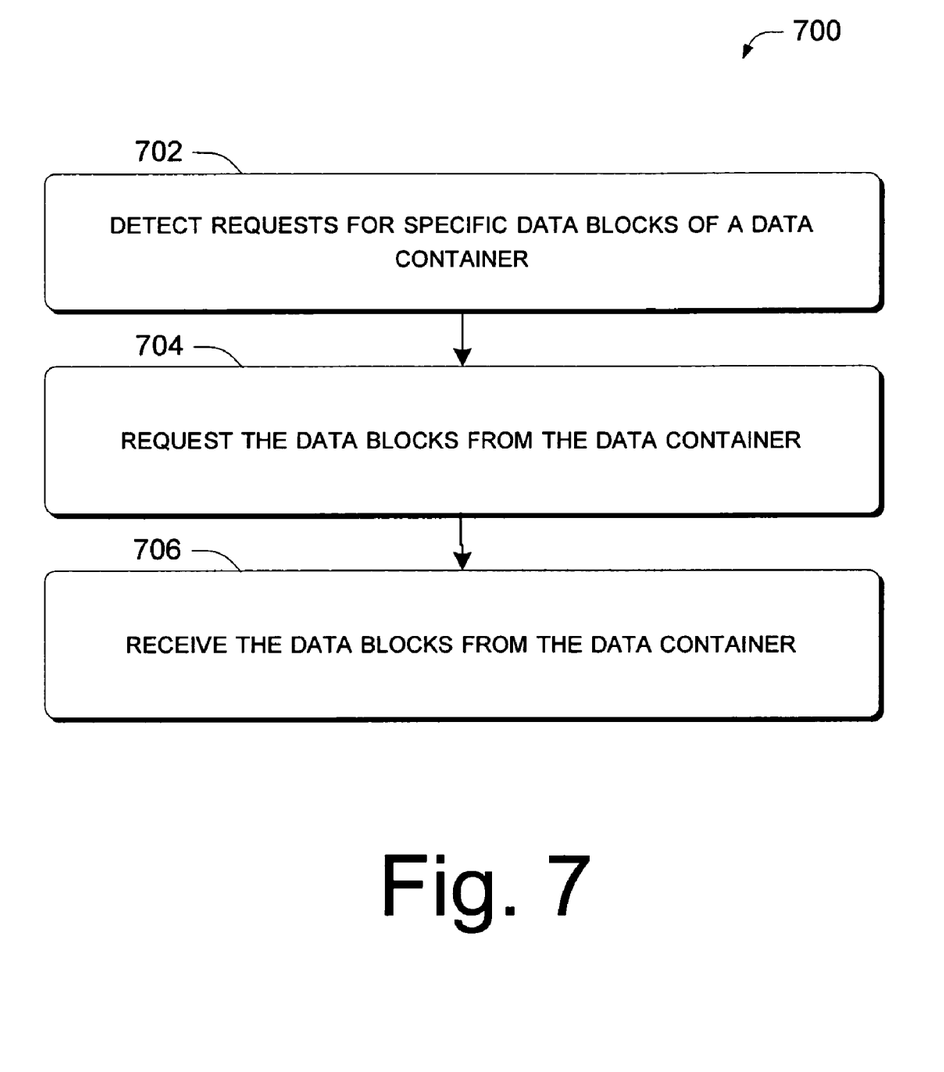
FIG. 7 illustrates an exemplary process diagram relating to progressive data downloading in accordance with one implementation.

FIG. 7 illustrates an exemplary process 700 related to progressive data downloading. The order in which the process is described is not intended to be construed as a limitation, and any number of the described process blocks can be combined in any order to implement the process. Furthermore, the process can be implemented in any suitable hardware, software, firmware, or combination thereof.

At block 702 the process detects requests for specific data blocks of a data container. Such requests, for instance, may be made by a data consumer attempting to generate a user-interface from the specific data blocks.

At block 704 the process requests the data blocks from the data container. In some instances, the requests to the data container may mirror the detected requests of block 702. In other instances, the requests to the data container may combine one or more detected requests into a single request to the data container. For instance, the process may detect individual requests for hypothetical data blocks 1, 2, 3, and 4. The process may condense these four requests into a single request to the data container for blocks 1-4. In another example, the process may check whether individual data blocks are already available to the data consumer before requesting the data blocks. For instance, consistent with the above example, the process may determine that data block 3 is already available to the data consumer. For example, data block 3 may be available from a cache file accessible by the data consumer. In such an instance, the process, for example, may request data blocks 1-2 and 4, but not 3.

At block 706 the process receives the data blocks from the data container. The process may be agnostic to the data format of the data blocks such that the process can request and receive the data blocks without reading or understanding the data within the blocks. The process may store the data blocks for access by the data consumer and/or pass the data blocks to the data consumer for consumption.

Although implementations relating to progressive data downloading have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A method comprising:
   executing a progressive download component and a sequential download component on a local computing device;
   receiving, from a data consumer of the local computing device:
   a selection, by the sequential download component of the local computing device, to download a document in a sequential manner, the document having N pages with N being an integer value greater than or equal to 1, the document being constructed of data blocks, each of the data blocks being organized in a format as a specific part of a corresponding one of the N pages and numerically arranged to be associated with the corresponding one of the N pages; and
   a request, by the progressive download component of the local computing device, specifying one of the N pages of the document and a specific one of the data blocks of the one of the N pages, the specific data block comprising:
   a header of the one of the N pages;
   a font of the one of the N pages;
   text of the one of the N pages; or
   an image of the one of the N pages;
   requesting, by the sequential download component, the download of the document in the sequential manner from a data source;
   requesting, by the progressive download component, the specific one of the data blocks from the data source; and
   managing, by the progressive download component, the requesting of the specific one of the data blocks and a receiving of the specific one of the data blocks prior to receiving a remainder of the document being downloaded from the data source in the sequential manner.

2. The method as recited in claim 1, wherein the receiving and the requesting of the specific one of the data blocks, and the managing, are performed by the local computing device configured such that the data source is accessed from the local computing device via a network.

3. The method as recited in claim 2, wherein the managing the requesting comprises determining if the specific one of the data blocks is available on the local computing device before instructing the requesting of the specific one of the data blocks from the data source.

4. The method as recited in claim 2, wherein the managing the requesting comprises determining if the specific one of the data blocks is available in a cache file on the local computing device which is accessible by a consumer of the data block.

5. A computer-readable media comprising computer-executable instructions for a sequential download component and a progressive download component that, when executed on a local computing device, perform acts, the acts comprising:
   detecting, from a data consumer of the local computing device, requests for specific data blocks of a data container, the data container containing N pages of a document, N being an integer value greater than or equal to 1, each of the specific data blocks being:
      organized in a format in the data container as a specific part of one or another of the N pages of the document; and
      numerically arranged in the data container to be associated with the one or the another of the N pages of the document;
   detecting, by the local computing device, a selection to download the existing document;
   requesting, by the sequential download component, the download of the N pages of the document in a sequential manner from the data container based on the selection;
   requesting, by the progressive download component of the local computing device, the specific data blocks from the data container; and
   receiving, by of the local computing device, the specific data blocks from the data container, the specific data blocks being prioritized by the progressive download component and received in response to the requesting prior to receiving a remainder of the N pages of the document being downloaded from the data container in the sequential manner.

6. The computer-readable media of claim 5, wherein the detecting the requests for the specific data blocks comprises detecting a first individual request for a first data block relating to a given page of the document and a second individual request for a second data block relating to the given page of the document and wherein the first and second data blocks are not sequentially arranged in the data container.

7. The computer-readable media of claim 5, wherein the requesting the specific data blocks comprises requesting multiple specific data blocks with a single request.

8. The computer-readable media of claim 5, the acts further comprising prior to the requesting the specific data blocks, checking whether the specific data blocks have already been obtained from the data container and are still available to a consumer of the specific data blocks.

9. The computer-readable media of claim 5, the acts further comprising assigning, by the progressive download component of the local computing device, bandwidth priority to the requesting the specific data blocks and the receiving the specific data blocks and utilizing available remaining bandwidth to sequentially download the N pages of the document in a front to back manner from the data container.

10. A system comprising:
   a client computing device having a processor and memory;
   an application stored in the memory and configured to, when executed on the processor, utilize data blocks to display content in a user-interface;
   a sequential download component stored in the memory and configured to, when executed on the processor, retrieve data blocks corresponding to pages of a document from a data container, the data blocks being retrieved in a sequential manner from the data container; and
   a progressive download component stored in the memory and configured to, when executed on the processor, retrieve specific ones of the data blocks from the data container responsive to requests from the application, the progressive download component being configured to prioritize and retrieve the specific ones of the data blocks prior to retrieving a remainder of data blocks being retrieved from the data container in the sequential manner, each of the data blocks being organized in the data container in a format as a specific part of one of the pages of the document, each of the data blocks being arranged in the data container to be associated with one of the pages of the document, each of the data blocks being organized in a format in the data container which groups associated ones of the data blocks together by type, each of the data blocks comprising:
      a header of one of the pages;
      a font of one of the pages;
      text of one of the pages; or
      an image of one of the pages.

11. The system as recited in claim 10, wherein the progressive download component is configured to condense multiple requests from the application into a single data request to the data container.

12. The system as recited in claim 10, wherein the progressive download component is configured to examine whether individual specific data blocks requested by the application have already been obtained before retrieving the individual specific data blocks from the data container.

13. The system as recited in claim 12, wherein the progressive download component and the application are implemented on the client computing device which is configured to be connected to the data container over a network and wherein the progressive download component is configured to examine whether individual of the specific ones of the data blocks are available on the client computing device before retrieving the individual of the specific ones of the data blocks from the container.

14. The system as recited in claim 12, wherein the progressive download component is allocated memory for retrieved specific data blocks and further comprising a cache file accessible to the application and configured to receive data blocks from the data container in the sequential manner from front to back, and wherein the progressive download component is configured to examine the allocated memory and the cache file for individual specific data blocks requested by the application prior to retrieving the individual specific data blocks from the data container.

15. The system as recited in claim 10 further comprising a cache file accessible to the application and configured to receive data blocks from the data container in the sequential manner from front to back, and wherein the progressive download component regulates data transfer such that if data transfer capacity exists which is not being utilized by the progressive download component to retrieve specific data blocks then the progressive download component allows the data transfer capacity to be utilized to transfer data blocks to the cache file.

16. The system as recited in claim 10, wherein the progressive download component has priority over the application relating to whether specific data blocks should be requested from the data container.

17. The system as recited in claim 10, wherein the progressive download component assigns priority in bandwidth allocation for retrieving individual specific data blocks, and wherein in instances where the bandwidth is under-utilized for retrieving the individual of the specific ones of the data blocks, the progressive download component assigns the available bandwidth to be utilized for downloading data blocks in the sequential manner.

18. The system as recited in claim 10, wherein the progressive download component is configured to retrieve requested data blocks without reading content of the data blocks.

* * * * *